(12) United States Patent
Leisner et al.

(10) Patent No.: US 6,782,138 B1
(45) Date of Patent: Aug. 24, 2004

(54) METHOD AND SYSTEM FOR PROCESSING MULTIDIMENSIONAL DATA

(75) Inventors: Christopher J. Leisner, West Lafayette, IN (US); Bradley J. Lucier, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 637 days.

(21) Appl. No.: 09/615,445

(22) Filed: Jul. 13, 2000

Related U.S. Application Data

(60) Provisional application No. 60/143,784, filed on Jul. 14, 1999.

(51) Int. Cl.[7] .................................................. G06K 9/36
(52) U.S. Cl. ...................................... 382/276; 382/277
(58) Field of Search ................................ 382/276, 277, 382/299, 298, 264, 260, 254; 345/698, 419

(56) References Cited

U.S. PATENT DOCUMENTS

| | | | |
|---|---|---|---|
| 5,402,148 A | * 3/1995 | Post et al. .................. 345/698 |
| 5,727,092 A | 3/1998 | Sandford, II et al. ........ 382/251 |
| 5,745,392 A | 4/1998 | Ergas et al. ............ 364/715.02 |
| 5,828,849 A | 10/1998 | Lempel et al. .......... 395/200.77 |
| 5,901,249 A | 5/1999 | Ito .............................. 382/239 |
| 6,009,208 A | 12/1999 | Mitra et al. ................. 382/254 |
| 6,289,137 B1 | * 9/2001 | Sugiyama et al. .......... 382/299 |
| 6,345,126 B1 | * 2/2002 | Vishwanath et al. ........ 382/253 |
| 6,385,248 B1 | * 5/2002 | Pearlstein et al. ..... 375/240.25 |
| 6,389,180 B1 | * 5/2002 | Wakisawa et al. .......... 382/298 |

* cited by examiner

*Primary Examiner*—Yon J. Couso
(74) *Attorney, Agent, or Firm*—Schwegman, Lundberg, Woessner & Kluth, P.A.

(57) ABSTRACT

A method and system for processing multidimensional data. A method of forming multiresolution representations of data includes partitioning the data in a first dimension at a first rate, and partitioning the data in a second dimension at a second rate, wherein the first rate is not equal to the second rate. In one embodiment, the first rate is set to one, and the second rate is computed as the ratio of a smoothness estimate of the first dimension data and a smoothness estimate of the second dimension data. The partitioned data may be processed further through data compression, noise removal, or similar data processing methods.

17 Claims, 3 Drawing Sheets

METHOD AND SYSTEM FOR PROCESSING MULTIDIMENSIONAL DATA

This application claims benefit of Ser. No. 60/143,784 filed Jul. 14, 1999.

GOVERNMENT SUPPORT

This invention was made with U.S. Government support under Navy, Grant No. N00014-91-J-1152. The Government has certain rights in the invention.

FIELD

The present invention relates to processing data, and more particularly to processing multidimensional data.

BACKGROUND

Many multidimensional data processing algorithms are based on multiresolution decompositions. These algorithms include, for example, compression algorithms, noise removal algorithms, and algorithms for the reconstruction of images. The more efficiently these algorithms operate, the better the modern communications and information processing systems in which they are embedded operate. For example, efficient compression algorithms permit fast transmission of information in communication systems. Without efficient compression algorithms, multidimensional data requires an unacceptable amount of bandwidth for transmission and an unacceptable amount of storage for archiving.

Consider, for example, a medical image, such as a mammographic screening image, which may be represented by four six-thousand pixel by six-thousand pixel arrays. A mammographic screening image consists of four images, two images for each of two breasts. Of the two images associated with each breast, one image is a top image and one image is a side image. A pixel is a "picture element," which is an elementary unit of information contained in an image and is typically represented by an intensity level. If each pixel in the mammographic screening image is represented by sixteen bits, then each pixel may be encoded at one of 65,536 possible intensity levels. To transmit the mammographic screening image without compression, 2.3 billion bits must be sent over a communication link. A typical telephone line is capable of transmitting about 56,000 bits per second, so transmission of a mammographic screening image would require more than ten hours. A ten hour transmission time is unacceptable for transmitting a mammographic screening image, so image compression processing is used to reduce the transmission time.

Prior to processing multidimensional data using some compression methods, such as wavelet compression, the multidimensional data is approximated at several resolution levels. For example, two-dimensional image data is initially divided into two rows and two columns. Each row and each column is subsequently divided into two rows and two columns. FIG. 1 is an illustration of a sequence of images 100, including images 101, 103, 105, and 107, of multidimensional data partitioned into rows and columns. The images 101, 103, 105, and 107 illustrate partitioning a first dimensions 109 (rows) and a second dimension 111 (columns) at a rate of one. Image 101 is partitioned in the first dimension 109 and the second dimension 111. Each of the partitions in image 101 is partitioned or divided to form image 103. Each of the partitions in image 103 are partitioned or divided to form image 105. And each of the partitions in image 105 are partitioned or divided to form image 107. The partitioning or subdividing of rows and columns continues until an acceptable resolution level is achieved. An acceptable resolution level is a level at which data can be compressed, transmitted, and decompressed, such that the decompressed data includes the information contained in the original data required by a viewer of the received data. For example, in the mammographic screening example described above, the decompressed data must contain enough information related to a cancerous tumor to allow a radiologist to identify the cancerous tumor by viewing the mammographic screening images reconstructed from the compressed data.

Isotropic decomposition is one type of decomposition used in some multidimensional data processing algorithms. To perform isotropic decomposition, one begins with a function $\phi$ of one variable such that the set $$\{\phi(x-j)|j\in\mathbb{Z}\}$$

forms a Riesz basis for the span of these functions. Assume that $\phi$ satisfies the rewrite rule $$\phi(x) = \sum_j a_j \phi(x-j) \qquad (1)$$

for a finite set of coefficients $\alpha_j$. Let $S_k$ be the space of all functions $$S_k := \left\{ \sum_j c_j \phi(2^k x - j) \,\middle|\, c_j \in \mathbb{R} \right\}$$

and choose a bounded projection $P_k$ from $L_p(\mathbb{R})$ to $S_k$. Under certain conditions (see Daubechies) any $f \in L_p(\mathbb{R})$ can be re-written as $$f = \lim_{k \to \infty} P_k = P_0 f + \sum_{k=1}^{\infty} (P_k f - P_{k-1} f)$$

where, because of the rewrite rule (1), $P_k f - P_{k-1} f$ is in $S_k$. Thus, since $P_0 f \in S_0$, $$f = P_0 f + \sum_{k=1}^{\infty} (P_k f - P_{k-1} f)$$

$$= \sum_{j \in Z} d_j \phi(\cdot - j) + \sum_{k=1}^{\infty} \sum_{j \in Z} d_{j,k} \phi(2^k \cdot - j).$$

For suitable functions $\phi$ and special projectors $P_k$, one can find a function $\psi$, associated with $\phi$, such that $$P_k f - P_{k-1} f = \sum_{j \in Z} c_{j,k-1} \psi(2^{k-1} \cdot - j)$$

(note the new scaling $-2^{k-1}$ instead of $2^k$) so that $$f = \sum_{j \in Z} d_j \phi(\cdot - j) + \sum_{k=0}^{\infty} \sum_{j \in Z} c_{j,k} \psi(2^k \cdot - j).$$

For a function $f: \mathbb{R}^d \to \mathbb{R}$ a similar decomposition holds. Define a set $\Psi$ of $2^d - 1$ functions defined for $x = (x_1, \ldots, x_d) \in \mathbb{R}^d$ by $$\Psi := \left\{ \prod_{i=1}^{d} v_i(x_i) | v_i = \phi \text{ or } v_i = \psi \right\} \setminus \left\{ \prod_{i=1}^{d} \phi(x_i) \right\}$$

together with the function $$\Phi(x) = \prod_{i=1}^{d} \phi(x_i).$$

Then, under suitable conditions, any $f$ in $L_p(\mathbb{R}^d)$ can be written as $$f = \sum_{j \in \mathbb{Z}^d} d_j \Phi(\cdot - j) + \sum_{k=0}^{\infty} \sum_{j \in \mathbb{Z}^d} \sum_{\psi \in \Psi} c_{j,k} \psi(2^k \cdot - j).$$

Note that, since $x=(x_1, \ldots, x_d)$ and the multi-index $j=(j_1, \ldots, j_d)$, $$\psi(2^k x - j) = \psi(2^k x_1 - j_1, \ldots, 2^k x_d - j_d),$$

i.e., each of the components $x_i$ of x has been scaled by the same amount, $2^k$.

One disadvantage of isotropic decomposition is that not all data is isotropic, and anisotropic multidimensional data is not efficiently processed by algorithms based on isotropic decomposition.

For these and other reasons there is a need for the present invention.

SUMMARY

According to one aspect of the present invention, a method is described for forming multi-resolution representations of data. The method includes the operations of partitioning the data in a first dimension at a first rate, and partitioning the data in a second dimension at a second rate, wherein the first rate is not equal to the second rate.

DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. As used herein, the term image is defined to be a collection of data, and an image may be displayed by a display device, such as a cathode ray tube, a liquid crystal display, or similar device.

Figure 1:
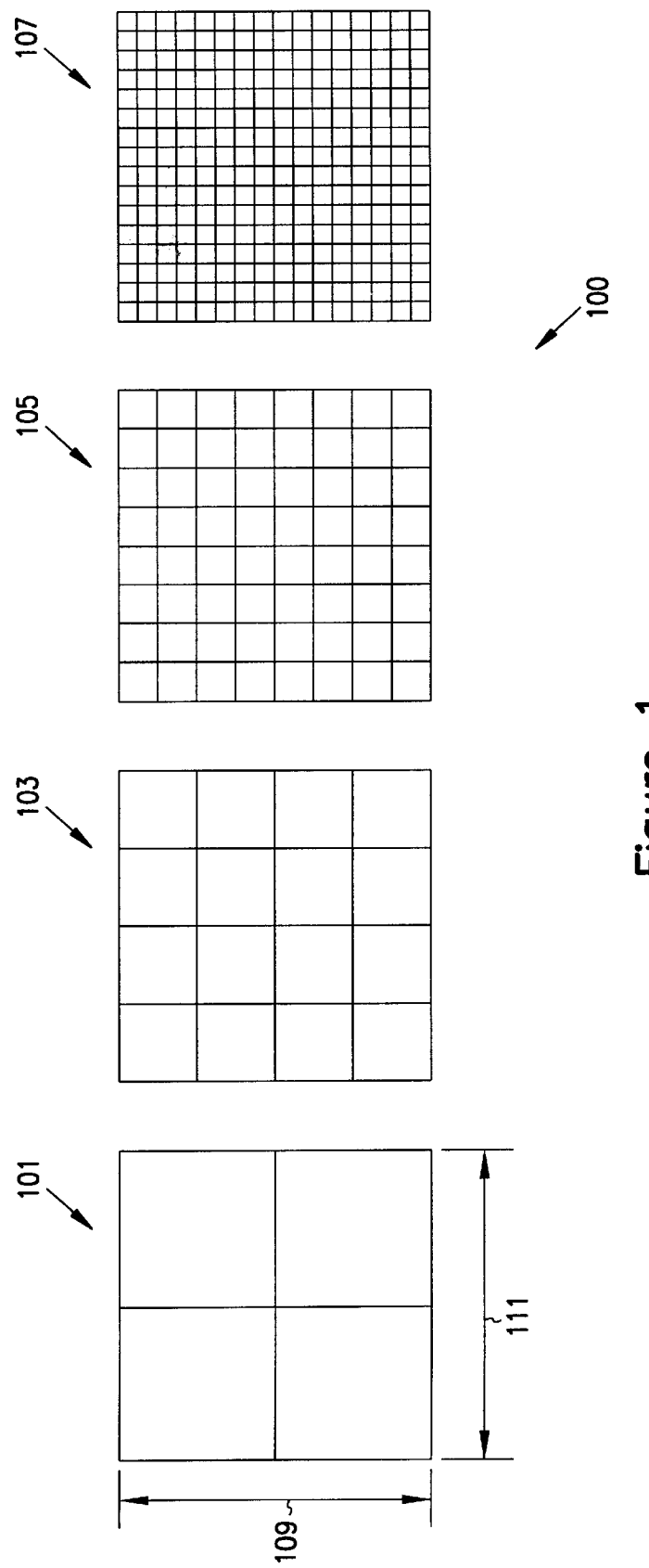
FIG. 1 is an illustration of a sequence of prior art images of multidimensional data being partitioned into rows and columns.
Figure 2:
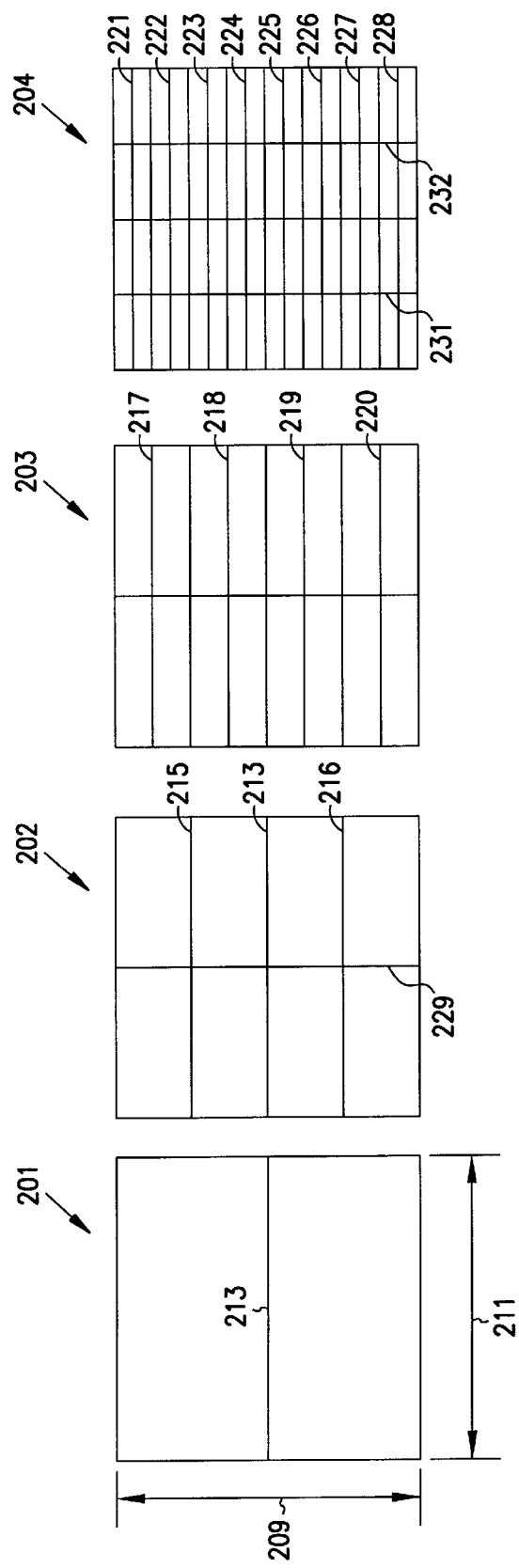
FIG. 2 is an illustration of a sequence of images of multidimensional data being partitioned according to the present invention.

FIG. 2 is an illustration of a sequence of images 201–204 being repeatedly partitioned according to the present invention. Each of the images in the sequence of images 201–204 is a representation of multidimensional data. In the illustration shown in FIG. 2, the multidimensional data is two-dimensional data, however, the present invention is not limited to processing two-dimensional data. The exemplary embodiments of the present invention described in the application are described in terms of two-dimensional data because two-dimensional data examples are most easily illustrated and understood. Those skilled in the art will recognize that the present invention is applicable to data having two or more dimensions.

The sequence of images 201–204 may represent a variety of data types. For example, in one embodiment of the present invention, the sequence of images 201–204 represents X-ray images. In an alternate embodiment, the sequence of images 201–204 represents magnetic resonance imaging (MRI) images. In another alternate embodiment, the sequence of images 201–204 represents positron emission tomography (PET) images. In another alternate embodiment, the sequence of images 201–204 represents multi-spectral images. In still another alternate embodiment, the sequence of images 201–204 represents video images in which one of the dimensions is time.

Each of the types of images described above, along with other types of images not described above, but which are also suitable for use in connection with the present invention, share a common characteristic which is that the smoothness of the data is anisotropic. Data smoothness is anisotropic when the data smoothness depends on the dimension of the data in which the smoothness is being estimated. For example, for two-dimensional data having a first dimension and a second dimension, data having a smoothness estimate of two in the first dimension and a smoothness estimate of three in the second dimension is anisotropic. Examples of data that is anisotropic include hyperspectral image data and video data. Hyperspectral image data has the same smoothness in each of the two spatial directions in a fixed frequency band, but has a different smoothness in the frequency direction for a given spatial point. Video data has isotropic smoothness within a frame for a fixed time, but has a different smoothness in the time dimension.

In one embodiment of the present invention, Besov spaces are used to estimate the smoothness in a particular dimension and to determine whether the multidimensional data is anisotropic. The use of Besov spaces to estimate the smoothness in a particular dimension is described in detail below. However, the present invention is not limited to the use of Besov spaces in estimating the smoothness of multidimensional data. Any method, algorithm, or numerical calculation that is capable of estimating data smoothness is suitable for use in connection with the present invention.

Besov spaces can be used to measure the smoothness of data. Let the data be represented by a function $f: \Omega \to \mathbb{R}$, where $\Omega$ is an open subset of $\mathbb{R}^d$, d-dimensional Euclidean space. Assume that there are smoothness parameters $\alpha = (\alpha_1, \ldots, \alpha_d)$, with $\alpha_i > 0$, and to be specific, that we want to measure the smoothness of the data in the space $L_p(\mathbb{R}^d)$, so that the data has smoothness $\alpha_i$ in the $e_i$ direction, $i = 1, \ldots, d$, with $e_i = (0, \ldots, 0, 1, 0, \ldots, 0)$ being the ith coordinate vector, which has a 1 as its ith element and 0 as all other elements.

For any $h = (h_1, \ldots, h_d)$ in $\mathbb{R}^d$, define the rth difference of $f$ in the direction h at the point $x \in \mathbb{R}^d$ recursively as $$\Delta_h^r(f,x) := \Delta_h^{r-1}(f, x+h) - \Delta_h^{r-1}(f,x)$$

and $$\Delta_h^0(f,x) := f(x)$$

$\Delta_h^r(f,x)$ is defined on the set $$\Omega_{r,h} := \{x \in \Omega | x + kh \in \Omega, k=1, \ldots, r\}$$

Let $t = (t_1, \ldots, t_d)$, $t_i > 0$ for all i, and define the rth modulus of smoothness of $f$ in $L_p(\mathbb{R}^d)$ to be $$\omega_r(f, t)_p := \omega_r(f, t_1, \ldots, t_d)_p := \sup_{|h_i| \leq t_i} \|\Delta_h^r(f, \cdot)\|_{L_p(\Omega_{r,h})},$$

where $$\|g\|_{L_p(1)} := (\int_1 |f(x)|^p dx)^{1/p}.$$

The anisotropic Besov space $B_q^\alpha(L_p(\Omega))$ for $0 < \alpha_1, \ldots, \alpha_d < r$ is defined to be the set of all functions $f$ for which $$|f|_{B_q^\alpha(L_p(\Omega))} := \left( \sum_{k=0}^\infty [2^k \omega_r(f, 2^{-k/\alpha_1}, \ldots, 2^{-k/\alpha_d})_p]^q \right)^{1/q}$$

is finite, and $$\|f\|_{B_q^\alpha(L_p(\Omega))} := \|f\|_{L_p(\Omega)} + |f|_{B_q^\alpha(L_p(\Omega))}.$$

Heuristically, a function $f$ in $B_q^\alpha(L_p(\Omega))$ has $\alpha_i$ "derivatives" in $L_p$ in the ith coordinate direction.

If $\alpha_1 = \ldots = \alpha_d$, then $$|f|_{B_q^\alpha(L_p(\Omega))} := \left( \sum_{k=0}^\infty [2^k \omega_r(f, 2^{-k/\alpha_1}, \ldots, 2^{-k/\alpha_1})_p]^q \right)^{1/q}$$

which is equivalent to the usual semi-norm $$|f|_{B_q^\alpha(L_p(\Omega))} := \left( \sum_{k=0}^\infty [2^{\alpha_1 k} \omega_r(f, 2^k)_p]^q \right)^{1/q}$$

of the isotropic Besov space $B_q^{\alpha_1}(L_p(\Omega))$. A more detailed description of Besov spaces is provided in Technical Report #328 available from the Center for Applied Mathematics at Purdue University and is incorporated herein by reference.

In one embodiment of the present invention, multiresolution representations of data are formed by repeatedly partitioning the data in a first dimension at a first rate, and repeatedly partitioning the data in a second dimension at a second rate. The first rate is not equal to the second rate. For example, each of the images in the sequence of images 201–204 shown in FIG. 2 is a two-dimensional image having a first dimension 209 and a second dimension 211. The sequence of images 201–204 illustrates repeatedly partitioning data in dimension 209 at a first rate equal to one. The first line 213 in image 201 shows a partitioning of image 201 along the first dimension 209. In the partition illustrated in image 202, each partition in image 201 is divided into two partitions in dimension 209. In the images 202–204 partition lines 215–228 are added to illustrate that each of the partitions in each subsequent image is divided into two partitions. For the sequence of images 201–204, the partition rate in the first dimension is one, which means that partitioning occurs in each image in the sequence of images.

The sequence of images 201–204 also illustrates repeatedly partitioning data in second dimension 211 at a second rate equal to one-half. The first line 229 in image 202 shows a partitioning of image 201 along the second dimension 211. In the partition illustrated in image 202, image 201 in the second dimension is divided into two partitions. In the images 202–204, partition lines 231–232 are added to illustrate that each of the partitions in alternating subsequent images is divided into two partitions.

In an alternate embodiment of the present invention, an estimate of smoothness in a first dimension is obtained and an estimate of smoothness in a second dimensions is obtained. The smoothness estimates may be obtained using Besov spaces, as described above, or any other method of estimating smoothness. The first partition rate is set to one, and if the first dimension smoothness estimate is less than the second dimension smoothness estimate, then the second partition rate is set to a ratio of a first dimension smoothness estimate to a second dimension smoothness estimate. If the first dimension smoothness estimate is greater than the second dimension smoothness estimate, then the second rate is set to one and the first rate is set to a ratio of the second dimension smoothness estimate to the first dimension smoothness estimate.

Multidimensional anisotropic data can be decomposed. If a function $f: \mathbb{R}^d \to \mathbb{R}$ is in the anisotropic Besov space $$B_q^\alpha(L_p(\mathbb{R}^d))$$

then $$|f|_{B_q^\alpha(L_p(\Omega))} := \left( \sum_{k=0}^{\infty} [2^k \omega_r(f, 2^{-k/\alpha_1}, \ldots, 2^{-k/\alpha_d})_p]^q \right)^{1/q}$$

is finite. However, the quantity on the right is equivalent to $$\left( \sum_{k=0}^{\infty} [2^{k/\underline{\alpha}} \omega_r(f, 2^{-k\underline{\alpha}/\alpha_1}, \ldots, 2^{-k\underline{\alpha}/\alpha_d})_p]^q \right)^{1/q} \quad (2)$$

where $$\underline{\alpha} = \min_{1 \le i \le d} \alpha_i.$$

Note that $$\frac{\underline{\alpha}}{\alpha_i} \le 1$$

with equality only for those i for which $\alpha_i = \underline{\alpha}$; there is always at least one i for which this is true. Note also that (2) is equivalent to $$\left( \sum_{k=0}^{\infty} [2^{k/\underline{\alpha}} \omega_r(f, 2^{-\lfloor k\underline{\alpha}/\alpha_1 \rfloor}, \ldots, 2^{-\lfloor k\underline{\alpha}/\alpha_d \rfloor})_p]^q \right)^{1/q} \quad (3)$$

where $\lfloor y \rfloor$ is the greatest integer $\le y$, since this increases the size of each argument of the modulus of smoothness by at most a factor of 2.

Define $S_k$ to be the linear span of the functions $$\phi_{j,k}(x) := \prod_{i=1}^{d} \phi(2^{\lfloor k\underline{\alpha}/\alpha_i \rfloor} x_i - j_i)$$

for $j = (j_1, \ldots, j_d) \in \mathbb{Z}^d$. Note that the scaling in each variable is always an integer power of 2, so that $S_k$ is, indeed, included in $S_{k+1}$, by the rewrite rule for $\phi$; furthermore, since $\underline{\alpha}/\alpha_i = 1$ for at least one i, we know that $S_k$ is strictly contained in $S_{k+1}$, i.e., when moving from $S_k$ to $S_{k+1}$, one refines functions by a factor of two in at least one direction. In fact, going from $S_k$ to $S_{k+1}$ we refine in all directions $e_i$ for which $$\frac{\underline{\alpha}}{\alpha_i} k < m_{k,i} \le \frac{\underline{\alpha}}{\alpha_i}(k+1)$$

for some integer $m_{k,i}$, and for no other directions.

Thus, if $P_k$ is defined to be the projection onto the new $S_k$, then $$f = P_0 f + \sum_{k=1}^{\infty} (P_k f - P_{k-1} f),$$

and $P_k f - P_{k-1} f$ is again in $S_k$. If there is a function $\psi$ associated with $\phi$ and the projections $P_k$, then $P_k f - P_{k-1} f$ can be written as a linear combination of the functions $$\prod_{\substack{i \in \Lambda_k \\ \eta_i = \phi \text{ or } \eta_i = \psi \\ \text{not all } \eta_i = \phi}} \eta_i(2^{\lfloor (k-1)\underline{\alpha}/\alpha_i \rfloor} x_i - j_i) \prod_{i \notin \Lambda_k} \phi(2^{\lfloor (k-1)\underline{\alpha}/\alpha_i \rfloor} x_i - j_i)$$

for all $j \in \mathbb{Z}^d$, where $\Lambda_k$ consists of the set of coordinates that are refined in going from $S_{k-1}$ to $S_k$. This method can be applied to all orthogonal and biorthogonal wavelets, wavelet frames, or like multiresolution methods. A more detailed description of multiresolution decomposition is provided in Technical Report #328 available from the Center for Applied Mathematics at Purdue University and is incorporated herein by reference.

The methods of the present invention may be realized, at least in part, as one or more programs or modules running on a computer—that is, as a program or module executed from a computer-readable medium such as a memory by a processor of a computer. The programs are desirably storable on a computer-readable medium such as a floppy disk or a CD-ROM, for distribution and installation and execution on another (suitably equipped) computer.

Figure 3:
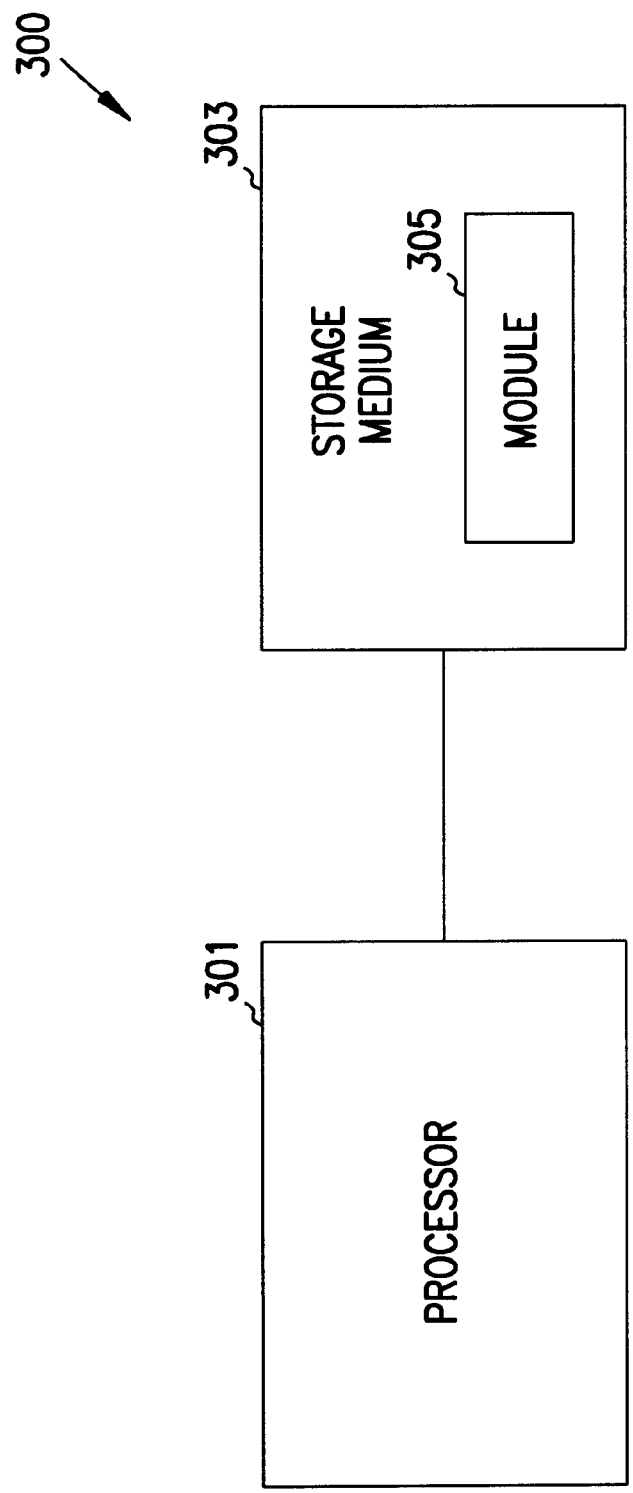
FIG. 3 is a block diagram of one embodiment of a system including a computer-readable medium having computer-executable instructions for performing a method according to the present invention.

FIG. 3 is a block diagram of one embodiment of a computerized system 300 according to the present invention. In one embodiment of the present invention, the computerized system 300 is used to form multiresolution representations of data. The computerized system 300 includes a processor 301, a storage medium 303, and a module 305. The processor 301 is coupled to the storage medium 303, and module 305 is capable of being stored on storage medium 303. In one embodiment, the processor 301 is a microprocessor, however the present invention is not limited to use in connection with a particular type of processor. Any processor, such as a digital signal processor (DSP), a reduced instruction-set computing (RISC) processor, or a complex instruction-set computing (CISC) processor, capable of processing information is suitable for use in connection with the present invention. In one embodiment, the storage medium 303 is a computer-readable storage medium, such as a CD-ROM, floppy disk, or a semiconductor storage device, such as a cache memory. Using a cache memory to store the module permits multiresolution representations of the data to be quickly generated. The module 305 is capable of executing on the processor 301 and capable of repeatedly partitioning data in a first dimension at a first rate, and repeatedly partitioning data in a second dimension at a second rate, wherein the first rate is not equal to the second rate.

In an alternate embodiment of the present invention, data having a time dimension is decomposed using multiresolution decomposition. Exemplary types of data having a time dimension include video images, seismic images, functional (time dependent) magnetic resonance imaging (fMRI) images, and functional (time dependent) positron emission tomography (fPET) images or kinetic positron emission tomography (PET). Functional MRI images and functional PET images are generally considered to be images obtained from techniques involving fast MRI scans, fast PET scans, or techniques for co-registering PET and MRI scans. However, in the present invention, fMRI and fPET images are any anisotropic images obtained using MRI imaging systems, PET imaging systems or combinations of MRI and PET imaging systems.

In one embodiment, a computer readable medium having computer-executable instructions for decomposing data having a time dimension includes a number of operations. First, a spatial dimension smoothness estimate for spatial dimension data is obtained. Second a time dimension smoothness estimate for the time dimension data is obtained. In one embodiment, the spatial dimension smoothness estimate and the time dimension smoothness estimate may be obtained by the use of Besov spaces. Third, a first data partition rate is set to one. Fourth, a second data partition rate is set to a ratio of the time dimension smoothness estimate to the spatial dimension smoothness estimate. Fifth, the spatial dimension data is repeatedly partitioned at the first rate. Sixth, the time dimension data is repeatedly partitioned at the second rate.

In another alternate embodiment, a method of compressing data having a first dimension and a second dimension includes forming a multiresolution representation of the data and compressing the multiresolution representation of the data. The method of forming the multiresolution representation of the data includes repeatedly partitioning the data in the first dimension at a first rate, and repeatedly partitioning the data in the second dimension at a second rate, wherein the first rate is not equal to the second rate. Repeatedly partitioning the data in the second dimension at a second rate comprises estimating a first smoothness in the first dimension, estimating a second smoothness in the second dimension, and computing the second rate by forming a ratio of the first smoothness to the second smoothness. In one embodiment, compressing the multiresolution representation of the data includes compressing the multiresolution representation of the data using wavelet compression.

In still another alternate embodiment of the present invention, a method includes forming a multiresolution representation of video data having a spatial dimension and a time dimension and processing the multiresolution representation of the video data to remove noise from the multiresolution representation of the video data. Processing the multiresolution representation of the video data to remove noise from the multiresolution representation of the video data comprises filtering the multiresolution representation of the video data. In one embodiment, processing the multiresolution representation of the video data comprises filtering the multiresolution representation of the data using a low-pass filter. In an alternate embodiment, processing the multi-resolution representation of the video data to remove noise from the multi-resolution representation of the video data comprises filtering the multiresolution representation of the video data using a band-pass filter. The filters used to process the multiresolution representation of the video data are typically digital filters.

A method and system for processing multidimensional data has been described. The method and system are based on anisotropic multidimensional decompositions, including anisotropic wavelet decompositions. The method provides for preparing multidimensional scalar or vector data with anisotropic smoothness for further processing, such as data compression, noise removal, and reconstruction.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is intended that this invention be limited only by the following claims and equivalents thereof.

What is claimed is:

1. A method of forming multi-resolution representations of data, the method comprising:
    partitioning the data in a first dimension at a first rate;
    partitioning the data in a second dimension at a second rate, wherein the first rate is not equal to the second rate;
    obtaining a first dimension smoothness estimate;
    obtaining a second dimension smoothness estimate;
    setting the first rate to one, and setting the second rate to a first ratio of the first dimension smoothness estimate to the second dimension smoothness estimate, if the first dimension smoothness estimate is less than the second dimension smoothness estimate; and
    setting the second rate to one, and setting the first rate to a second ratio of the second dimension smoothness estimate to the first dimension smoothness estimate, if the first dimension smoothness estimate is greater than the second dimension smoothness estimate.

2. The method of claim 1, wherein obtaining a first dimension smoothness estimate comprises:
    using a Besov space to generate the first dimension smoothness estimate.

3. The method of claim 2, wherein obtaining a second dimension smoothness estimate comprises:
    using a Besov space to generate the second dimension smoothness estimate.

4. A computer readable medium having computer-executable instructions for performing a method comprising:
    obtaining a spatial dimension smoothness estimate for spatial dimension data;
    obtaining a time dimension smoothness estimate for time dimension data;
    setting a first rate to one, and setting a second rate to a ratio of the time dimension smoothness estimate to the spatial dimension smoothness estimate;
    partitioning the spatial dimension data at the first rate; and
    partitioning the time dimension data at a second rate.

5. The computer readable medium of claim 4, wherein obtaining a spatial dimension smoothness estimate for spatial dimension data comprises:
    using a Besov space to generate the spatial smoothness estimate.

6. The computer readable medium of claim 5, wherein obtaining a time dimension smoothness estimate for the time dimension data comprises:
    using a Besov space to generate the time smoothness estimate.

7. A method of compressing data having a first dimension and a second dimension, the method comprising:
    forming a multi-resolution representation of the data by a method comprising:
        partitioning the data in the first dimension at a first rate; and
        partitioning the data in the second dimension at a second rate, wherein the first rate is not equal to the second rate;
    compressing the multi-resolution representation of the data;
    estimating a first smoothness in the first dimension;
    estimating a second smoothness in the second dimension; and
    computing the second rate by forming a ratio of the first smoothness to the second smoothness.

8. A method of removing noise from video data, comprising:
    forming a multi-resolution representation of the video data having a spatial dimension and a time dimension by a method comprising:
        partitioning the video data in the spatial dimension at a first rate; and partitioning the video data in the time dimension at a second rate, wherein the first rate is not equal to the second rate; and processing the multi-resolution representation of the video data to remove noise from the multi-resolution representation of the video data.

9. The method of claim 8, wherein processing the multi-resolution representation of the video data to remove noise from the multi-resolution representation of the video data comprises:

filtering the multi-resolution representation of the video data.

10. The method of claim 8, wherein processing the multi-resolution representation of the video data to remove noise from the multi-resolution representation of the video data comprises:

filtering the multi-resolution representation of the data using a low-pass filter.

11. The method of claim 8, wherein processing the multi-resolution representation of the video data to remove noise from the multi-resolution representation of the video data comprises:

filtering the multi-resolution representation of the video data using a band-pass filter.

12. A method comprising:

partitioning functional positron image tomography data in a first dimension at a first rate;

partitioning the functional positron image tomography data in a second dimension at a second rate, wherein the first rate is not equal to the second rate;

obtaining a first dimension smoothness estimate;

obtaining a second dimension smoothness estimate;

setting the first rate to one, and setting the second rate to a first ratio of the first dimension smoothness estimate to the second dimension smoothness estimate, if the first dimension smoothness estimate is less than the second dimension smoothness estimate; and setting the second rate to one, and setting the first rate to a second ratio of the second dimension smoothness estimate to the first dimension smoothness estimate, if the first dimension smoothness estimate is greater than the second dimension smoothness estimate.

13. The method of claim 12, wherein obtaining a first dimension smoothness estimate comprises:

using a Besov space to generate the first dimension smoothness estimate.

14. The method of claim 12, wherein obtaining a second dimension smoothness estimate comprises:

using a Besov space to generate the second dimension smoothness estimate.

15. A method comprising:

partitioning functional magnetic resonance imaging data in a first dimension at a first rate;

partitioning the functional magnetic resonance imaging data in a second dimension at a second rate, wherein the first rate is not equal to the second rate;

obtaining a first dimension smoothness estimate;

obtaining a second dimension smoothness estimate;

setting the first rate to one, and setting the second rate to a first ratio of the first dimension smoothness estimate to the second dimension smoothness estimate, if the first dimension smoothness estimate is less than the second dimension smoothness estimate; and setting the second rate to one, and setting the first rate to a second ratio of the second dimension smoothness estimate to the first dimension smoothness estimate, if the first dimension smoothness estimate is greater than the second dimension smoothness estimate.

16. The method of claim 15, wherein obtaining a first dimension smoothness estimate comprises:

using a Besov space to generate the first dimension smoothness estimate.

17. The method of claim 15, wherein obtaining a second dimension smoothness estimate comprises:

using a Besov space to generate the second dimension smoothness estimate.

* * * * *